United States Patent
Crenshaw et al.

(10) Patent No.: US 7,170,395 B2
(45) Date of Patent: Jan. 30, 2007

(54) METHOD AND APPARATUS FOR ATTACHING POWER LINE COMMUNICATIONS TO CUSTOMER PREMISES

(75) Inventors: Ralph E. Crenshaw, Crownsville, MD (US); David W. Grimes, Trappe, MD (US); L. Peter Larson, Annapolis, MD (US); Andrew Pozsgay, Germantown, MD (US)

(73) Assignee: Telkonet Communications, Inc., Germantown, MD (US)

( * ) Notice: Subject to any disclaimer, the term of this patent is extended or adjusted under 35 U.S.C. 154(b) by 233 days.

(21) Appl. No.: 10/823,551

(22) Filed: Apr. 14, 2004

(65) Prior Publication Data

US 2004/0196144 A1    Oct. 7, 2004

Related U.S. Application Data

(63) Continuation-in-part of application No. 10/219,811, filed on Aug. 16, 2002, now Pat. No. 6,975,212.

(60) Provisional application No. 60/326,205, filed on Oct. 2, 2001.

(51) Int. Cl.
*G05B 11/01*    (2006.01)

(52) U.S. Cl. ............... 340/310.11; 307/3; 340/310.18; 375/212; 375/257; 375/260

(58) Field of Classification Search ........... 340/310.11, 340/310.17, 310.18; 375/212, 257, 260; 370/485, 401, 407; 307/3
See application file for complete search history.

(56) References Cited

U.S. PATENT DOCUMENTS

| | | | | |
|---|---|---|---|---|
| 4,188,619 | A * | 2/1980 | Perkins | 307/3 |
| 4,675,648 | A * | 6/1987 | Roth et al. | 307/104 |
| 5,206,777 | A * | 4/1993 | Clarey et al. | 361/63 |
| 5,257,006 | A * | 10/1993 | Graham et al. | 307/11 |
| 6,014,386 | A * | 1/2000 | Abraham | 370/485 |
| 6,570,493 | B1 * | 5/2003 | Rotem | 340/310.11 |
| 6,614,326 | B2 * | 9/2003 | Merriman et al. | 333/100 |
| 6,842,668 | B2 * | 1/2005 | Carson et al. | 700/286 |
| 2003/0071719 | A1 | 4/2003 | Crenshaw et al. | 340/310.01 |

* cited by examiner

*Primary Examiner*—Brent A. Swarthout
(74) *Attorney, Agent, or Firm*—B. Y. Mathis

(57) ABSTRACT

A method and apparatus for modifying a three-phase power distribution network in a building in order to provide data communication by using a Power Line Carrier (PLC) signal to an approximate electrical central location point of Wye-connected and Delta connected power distribution system remote from the data entry point of the building. A passive coupler device is attached to a centrally located service panel. The passive coupler receives the Power Line Carrier (PLC) signal from the remote entry point in the building and conditions the signal for entry at the service panel onto each phase of the three phase power distribution network.

7 Claims, 6 Drawing Sheets

METHOD AND APPARATUS FOR ATTACHING POWER LINE COMMUNICATIONS TO CUSTOMER PREMISES

BACKGROUND AND SUMMARY OF THE INVENTION

This application is a continuation-in-part of application Ser. No. 10/219,811, filed Aug. 16, 2002 now U.S. Pat. No. 6,975,212, the disclosure of which is expressly incorporated by reference herein.

The ability to interconnect computers and other intelligent devices is a common requirement wherever people live and work today. The electrical connection required to form this local area network (LAN) has traditionally been accomplished by installing dedicated data wiring both inside buildings and between clusters of buildings. A number of wireless (i.e. radio) methods have also been developed and deployed to address this need.

More recently, technology to allow electric power wiring infrastructure to simultaneously transport data at high rates has been realized. This Power Line Carrier (PLC) technology typically uses modulated radio frequency (RF) signals below 50 MHz conducted on the power wiring to transport the data.

There are significant practical advantages offered by PLC technology—namely that electrical wiring, of necessity, must be installed and that data connectivity can therefore be immediately added at little (or no) additional cost, particularly in existing buildings. Similarly, electrical outlets are ubiquitous within modem buildings and significant operating convenience is realized when data is simultaneously available at every outlet.

Another advantage of PLC technology is that the range that can be achieved is significantly greater than wireless methods, particularly in commercial buildings constructed of heavier materials that severely attenuate wireless signals. Yet another advantage of PLC technology over wireless methods is that the data is inherently more secure since a physical connection is required to join the network.

The invention described here addresses several important problems that arise in the installation and use of PLC technology for local area data networks.

Most contemporary LANs are configured in a "hub and spoke" topology where a central server device supports a number of users and also provides a gateway to the Wide Area Network (WAN) and/or the Internet. Maximum utility for a PLC network is obtained when its' physical configuration mirrors the logical topology of the LAN, i.e. when the PLC gateway is effectively located at the "electrical center" of the space such that every outlet is served with the best possible PLC signal. This point is often a rarely accessed electrical panel in a service closet or the basement and is almost never co-located with other data processing equipment. The invention provides a simple means to remotely inject the PLC signals at this optimal point.

Another important issue, particularly in commercial buildings, is that 3-phase electrical power/wiring is commonly used and adequate coverage of a PLC network within the building is achieved only when all three phases are excited with the PLC signal. The invention provides for the simultaneous excitation of all 3 phases of power wiring with a single PLC signal.

Yet another related issue arises during the installation of PLC networks in environments that have natural barriers to the signals (or block them entirely). A common situation is where a building has been modified and all sections no longer share a common source of electrical power. Another common situation is where power is supplied from a central point and then distributed to sections of the space via transformers, often for purposes of distribution efficiency or electrical isolation. The invention also provides a simple and flexible means to inject a single PLC signal into any number of remote points as required to obtain adequate coverage.

The system according to the present invention interfaces a communicating signal with a three-phase power network of a building by feeding a power line carrier signal to a remotely located coupling device which is constructed to enable each of the three phases to be supplied with the PLC signal from the remote signal source. In another aspect of the present invention, the signal can be fed to two or more different parts of a building having different electrical isolation qualities with respect to a PLC signal by providing a separate coupling device for each part of the building.

Other objects, advantages and novel features of the present invention will become apparent from the following detailed description of the invention when considered in conjunction with the accompanying drawings.

DETAILED DESCRIPTION OF THE INVENTION

Embodiments of the current invention are directed to improving data connectivity afforded by PLC technology. While the carrier current coupler apparatus described here provides the means to effect the physical connection to the building power wiring, much of the improvement derives from identifying the appropriate point(s) at which to inject the PLC signal.

One common objective is to inject the PLC signal from a single, centralized device (often called a "gateway") into the building wiring in such a way that all receptacles in the building receive adequate signal for a second device (often called a "terminal") plugged in there to function properly. The attenuation of PLC signals along arbitrary runs of wiring is difficult to predict and highly variable so it is generally not possible to supply all receptacles with equal signal levels. A more achievable objective is to have the building and all of its' receptacles taken together as a system be well-behaved, i.e. where no single receptacle is completely cut off from the PLC signal and where the signal amplitude decreases in a reasonably predictable fashion with distance from the signal injection point.

Figure 1:
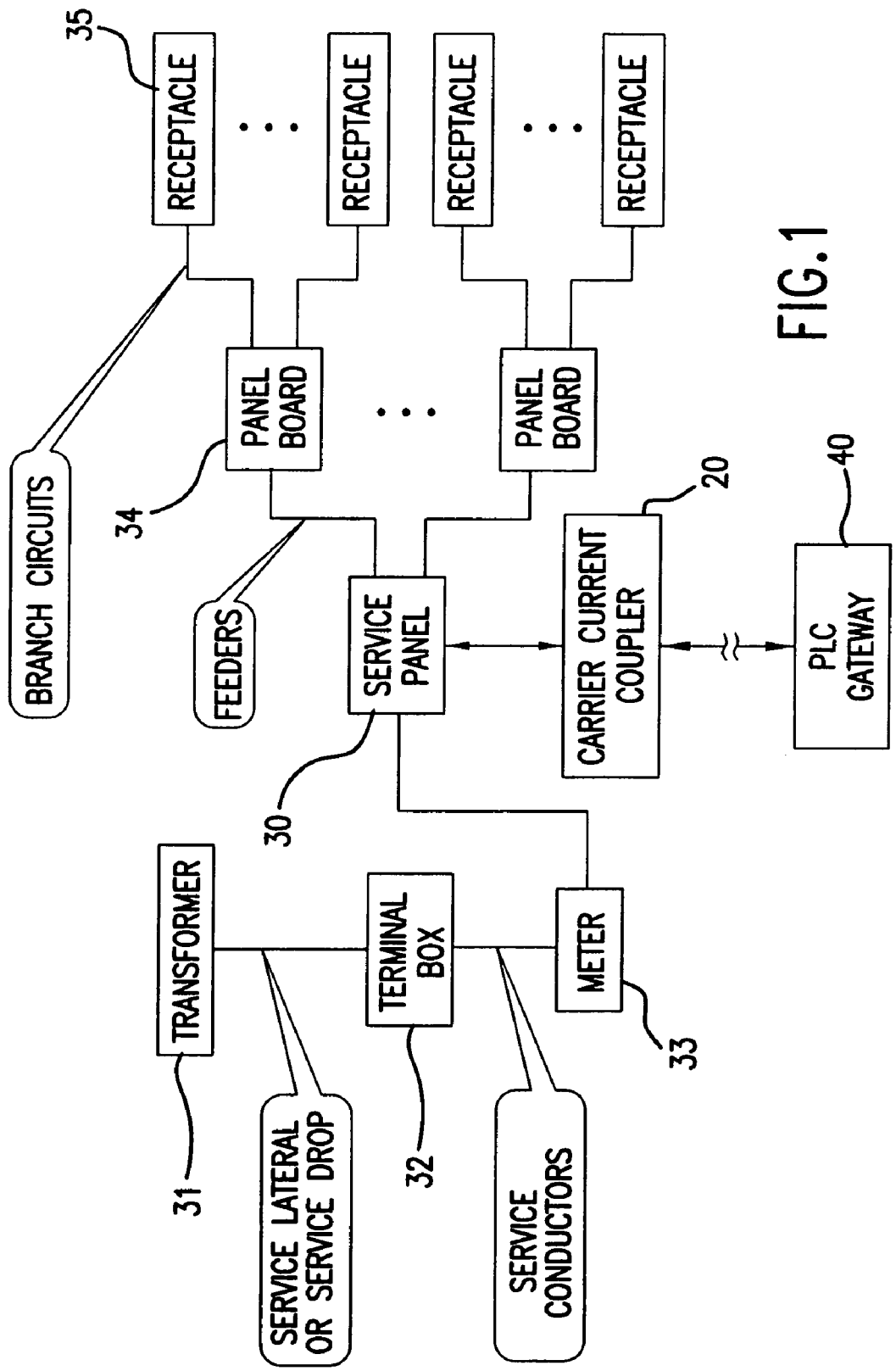
FIG. 1 is a simplified block diagram illustrating how electrical power is supplied to and distributed within buildings.

FIG. 1 shows a simplified block diagram of a building power distribution system and will be used to illustrate the above discussion. Electricity from the utility mains enters the facility via step down transformer (31) through terminal box (32) and is measured for billing purposes by meter (33). It is then conducted to service panel (30) where it is split and further directed to many receptacles (35) via panel boards (34). It is certainly possible to inject the gateway PLC signal at any of the above numbered points however the optimal point is probably service panel (30) because it symmetrically feeds all of the receptacles (35). PLC signal attenuated along the wiring from transformer (31) (if injected there) to the service panel (30) is entirely wasted since no terminal devices will ever be connected there. Similarly, injecting the gateway signal at one of the receptacles (35) could be workable but is probably not optimal since the receptacles are probably not symmetrically distributed about any given one.

Figure 2:
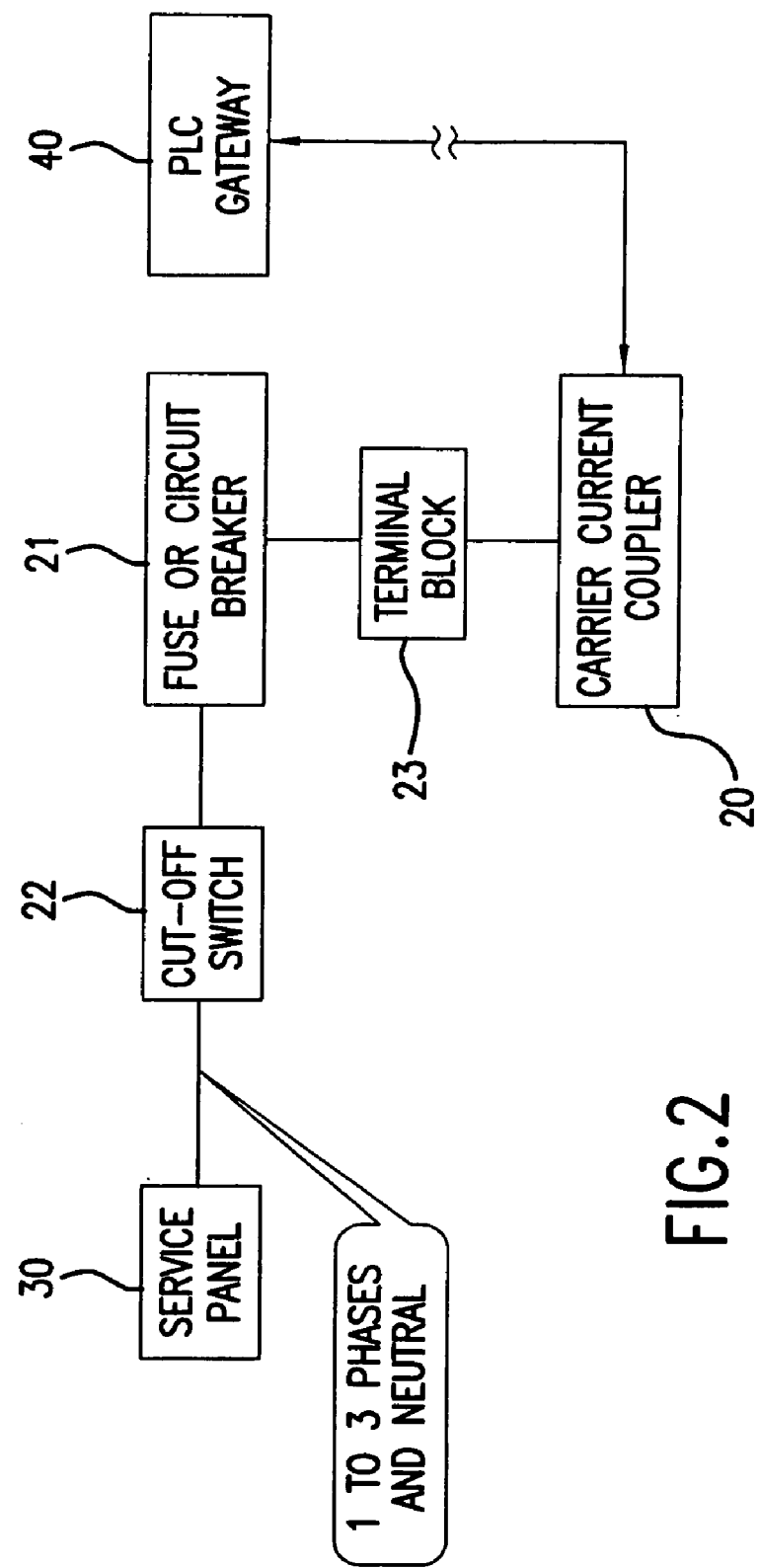
FIG. 2 expands a portion of FIG. 1 and illustrates how and where the coupler constructed in accordance with the present invention is positioned connected.

An optimized system which maximizes use of the passive coupler arrangement is to connect the carrier current coupler (20) to service panel (30), inject the PLC signal from gateway (40) into the building at that point and measure the data throughput performance at a number of receptacles by any commonly available means. FIG. 2 illustrates the details of making that connection.

Referring to FIG. 2, service panel (30) is the same as discussed previously. Accepted electrical safety requirements prescribed in the National Electrical Code require that a cut-off switch (22) and fuse/circuit breaker (21) be installed. Even though only minute PLC signal currents are expected to flow along this path, the cut-off switch (22) is necessary to protect service personnel from the power line voltage during installation/maintenance and the fuse/circuit breaker protects the building in event of a catastrophic failure of the carrier current coupler (20). Terminal block (23) provides a convenient attachment point for the wiring.

Figure 3:
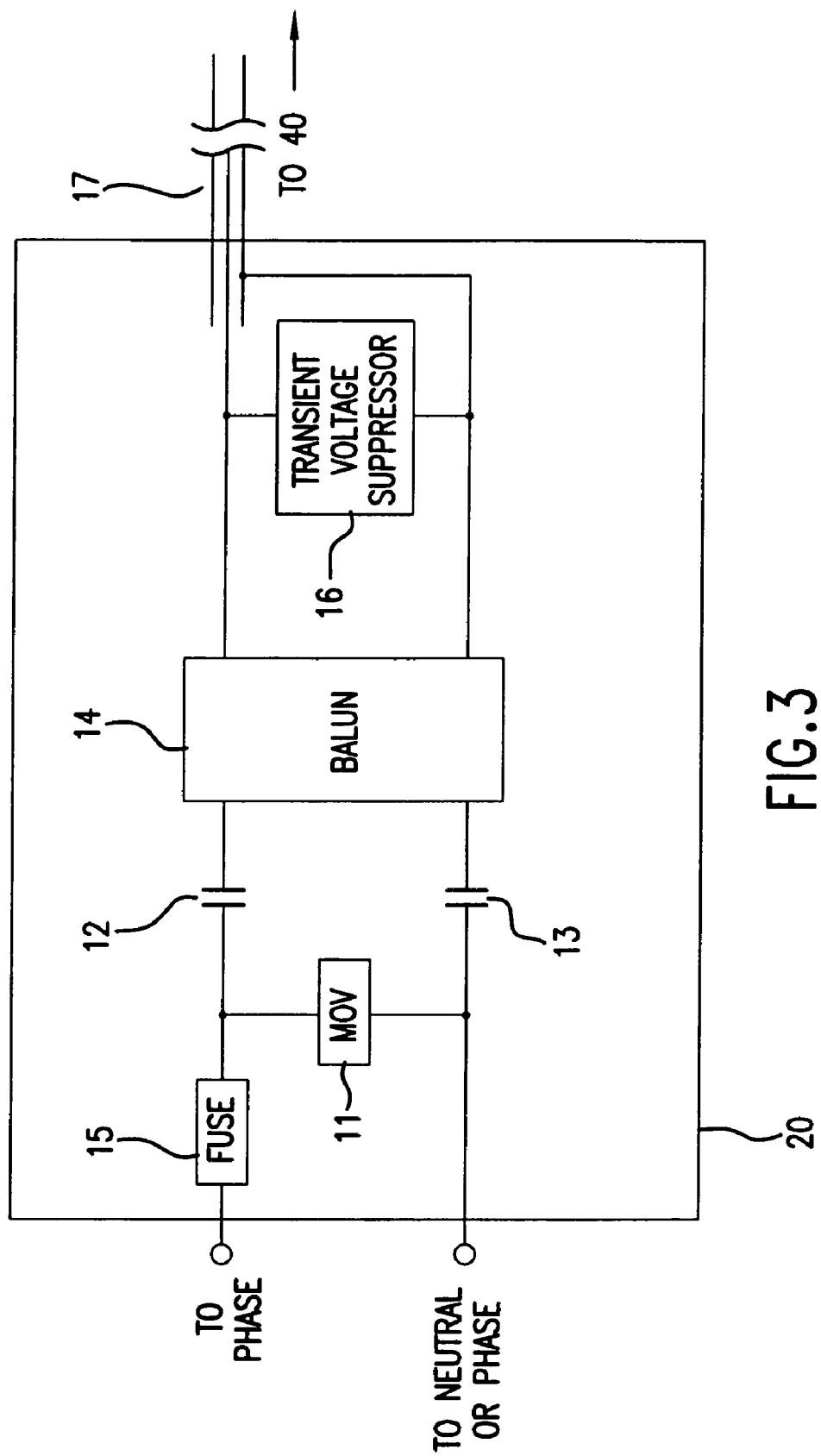
FIG. 3 is a schematic of the coupler according to the present invention.

An additional dimension to be considered is the common use of 3-phase power in commercial buildings. In this case, service panel (30) contains 3 hot wires (often referred to as "L1", "L2" and "L3"), a neutral and a ground wire. The object of the original building wiring plan was to balance the load across all 3 phases so roughly ⅓ of the receptacles (35) downstream will ultimately be connected to each of L1, L2 and L3. Therefore, to provide PLC signals to all receptacles, the signal must be split and fed to all 3 phases simultaneously. FIG. 3 illustrates such connection.

FIG. 3 shows the internal details of the carrier current coupler (20). The single-ended PLC signal from the gateway is conducted via coaxial cable (17) and subsequently coupled to each power phase via balun transformer (14) and capacitor (12). Capacitor (13) is optional and may or may not be used. Metal oxide varistor [MOV] (11) is used to suppress power line transients that might cause damage to the electronics in the gateway (40). Additional protection to the gateway electronics is provided by transient voltage suppressor (16). A second fuse (15) (generally rated at very low amperage) is used to further protect against short circuit failure of MOV (11). The circuit including capacitor (12), fuse (15) and MOV (11) is simply replicated to feed all 3 phases.

Figure 5:
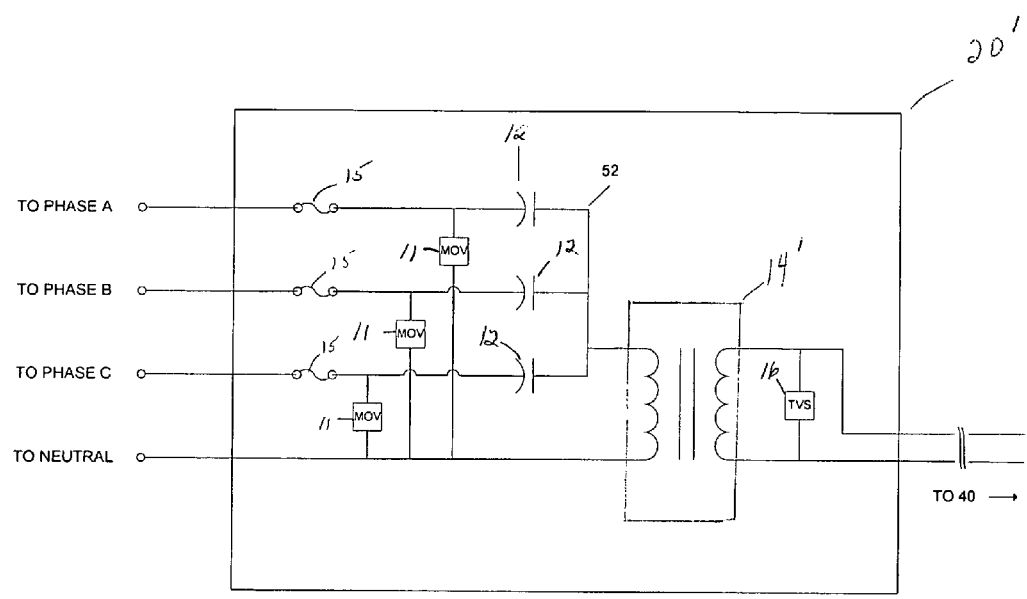
FIG. 5 is a schematic of a coupler configuration for use in a 3-phase Wye-connected power network

FIG. 5 illustrates a detailed circuit configurations when the power network is a Wye-connected 3-phase power network. In a Wye-connected 3-phase network, each single-phase receptacle (35) is connected to the Neutral and one of the 3 phases (A, B, or C). In the circuit 20' of FIG. 5, the 3 phases are essentially connected together in the frequency range of the communications signal by capacitors (12). Therefore, by connecting the communications signal across the Neutral and the combination node (52), the signal is from balun transformer 14' coupled across the two terminals of each receptacle (35).

Figure 6:
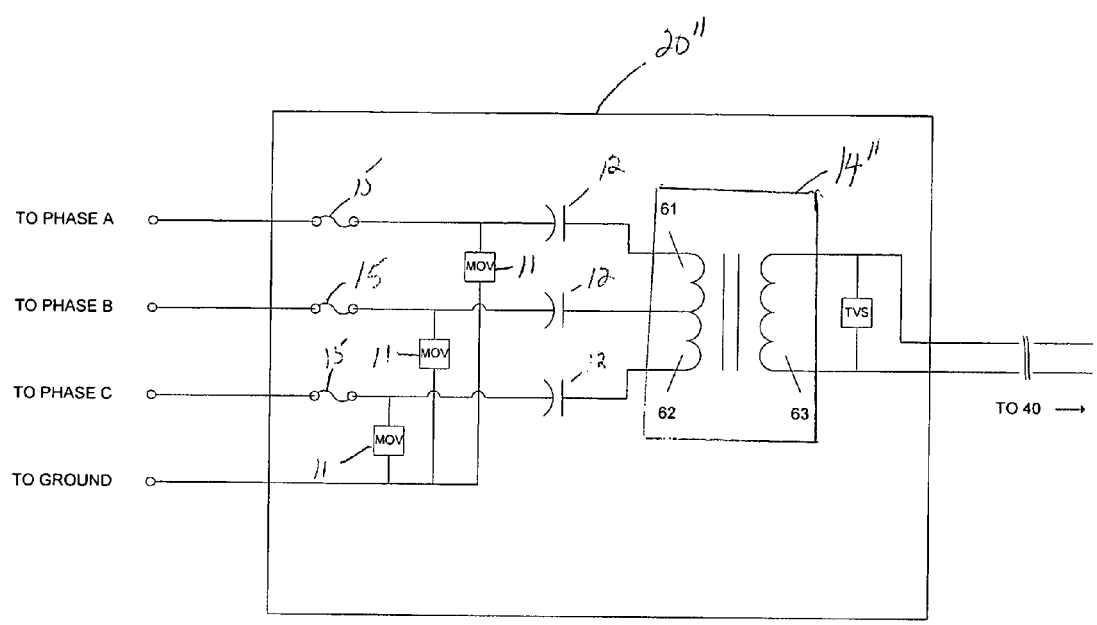
FIG. 6 is a schematic of a coupler configuration for use in a 3-phase Delta-connected power network

FIG. 6 illustrates a detailed circuit configuration when the power network is a Delta-connected 3-phase network. The circuit 20' addresses the modification required to avoid having 2 terminals of each receptacle (35) being connected together in the frequency range of the communication signal which would prevent signal coupling.

In order to couple the communications signal to all receptacles (35) in a Delta network, it is necessary to provide a signal voltage differential across all combinations of phases: A and B, B and C, & C and A. This can be accomplished with the circuit 20" of FIG. 6. An unavoidable consequence of this circuit is the fact that the turns ratio from the Gateway (40) to one of the phase combinations (in this case A-C) is one half the turns ratio from the Gateway (40) to the other two phase combinations (in this case A-B and B-C). To help remedy the situation, the number of turns in the phase windings (61, 62) of balun transformer 20" can be adjusted in relation to the number of turns in the Gateway (40) winding (63), such that the signal coupling effectiveness between the Gateway (40) and all 3 two-phase combinations is as near to equal as is practical.

Figure 4:
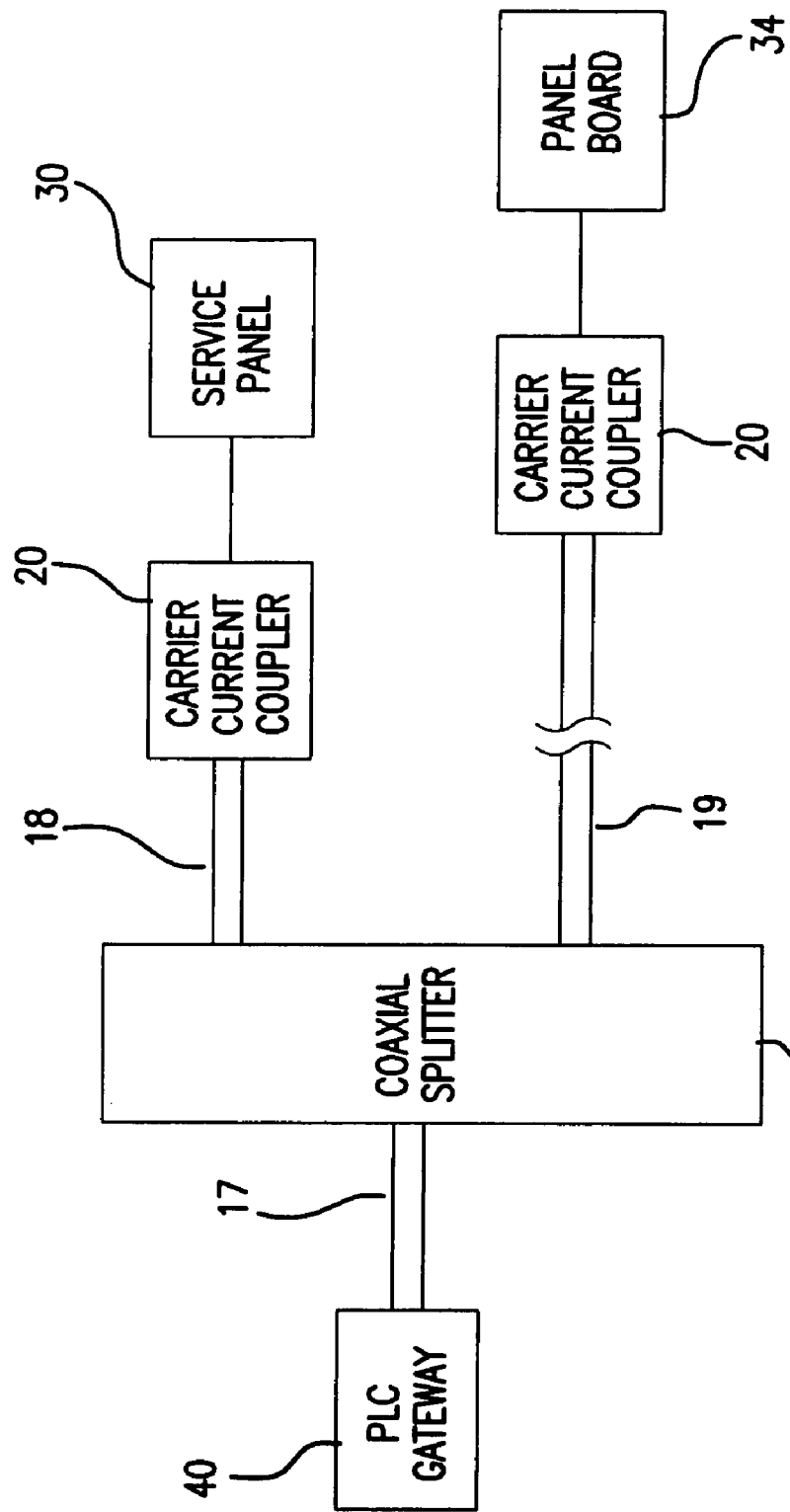
FIG. 4 details an arrangement for improving PLC signal coverage and is an embodiment of the invention for buildings having portions which are isolated with respect to communication data.

If installation is completed as discussed previously and acceptable data throughput results are obtained, no further work is necessary. On the other hand, one may find (referring once again to FIG. 1) that some receptacles (35) will not have adequate PLC signal. Assume for the purposes of this example that many of the receptacles (35) fed by one particular panel board (34) do not deliver adequate data throughput performance. It may be possible by observation and/or analytical means to determine why such is the case and remedy the situation. However, details of existing wiring behind walls and/or the history of prior modifications made to a building may not be readily apparent. FIG. 4 ("Multi-point PLC Signal Injection") illustrates a solution to this problem according to another embodiment afforded by the present invention.

FIG. 4 shows a PLC signal simultaneously injected at some point in addition to service panel (30) to remedy a coverage issue. Coaxial splitter (50) is a commonly available and inexpensive device used in cable TV systems to split a broadband signal for use at two or more locations. These devices may likewise be used to split a PLC signal. In this example, the PLC signal output of gateway (40) along coaxial cable (17) is split and directed via individual coaxial cables (18) and (19) to two carrier current couplers (20), one installed at service panel (30) as before and another at the particular panel board (34) having receptacles (35) with inadequate performance. In so doing, whatever physical issues prevented the original PLC signal from reaching this particular panel board are circumvented. Further, since all of the PLC signal power still remains inside the building, the only loss is the minimal attenuation which occurs in the coaxial splitter (50) itself. The effect of this process is therefore to provide adequate signal coverage where before there was none and to slightly reduce the signal amplitude in the rest of the space. Any number of variations of this technique can then be employed to address specific PLC signal coverage issues as they are subsequently discovered.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A system for interfacing a communication signal with a three phase electrical power network having at least one service panel, said system comprising:
 a carrier current device located at a first position and providing a power line carrier signal; and
 a passive coupling device adapted to be connected to one of said at least one service panel for coupling said power line carrier signal to each phase of a three phase power distribution network, wherein said three phase power distribution network is a Delta-connected three phase power distribution network;
 and wherein said passive coupling device includes a transformer device providing a signal voltage differential across all pairs of combinations of said three phases wherein a number of turns into output phase winding of said transformer are adjusted as a function of a number of turns in the primary winding of said transformer in order to substantially equalize signal coupling effectiveness between said primary winding and each of said pairs.

2. The system according to claim 1, wherein said one service panel is a service panel which is the most electrically centrally located service panel located in a building.

3. The system according to claim 1, wherein said passive coupling device is adapted to be coupled to a high voltage distribution system having a voltage of at least 277 volts.

4. The system according to claim 1, wherein the three phase electrical power network is located in a building.

5. The system according to claim 1, wherein the service panel is remote from the first position.

6. The system according to claim 5, wherein the three phase electrical power network is located in a building.

7. The system according to claim 5, wherein said power distribution network includes at least two service locations wherein said service location directly connected to said passive coupling device is the most centrally located of said at least two service locations with respect to the length of electrically wiring in said distribution network.

* * * * *